United States Patent
Mao et al.

(10) Patent No.: US 8,385,032 B1
(45) Date of Patent: Feb. 26, 2013

(54) HIGH EFFICIENCY BRIDGELESS PFC CONVERTER AND METHOD

(75) Inventors: Hengchun Mao, Plano, TX (US); Dianbo Fu, Plano, TX (US); Bing Cai, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 83 days.

(21) Appl. No.: 13/216,081

(22) Filed: Aug. 23, 2011

(51) Int. Cl.
*H02H 7/00* (2006.01)
*H02H 9/00* (2006.01)
*H02H 3/20* (2006.01)
*H02H 9/04* (2006.01)
*H02H 3/22* (2006.01)

(52) U.S. Cl. ............... 361/18; 361/91.1; 361/111
(58) Field of Classification Search .......... 361/18
See application file for complete search history.

(56) References Cited

U.S. PATENT DOCUMENTS

| | | | |
|---|---|---|---|
| 4,412,277 A | 10/1983 | Mitchell | |
| 5,793,626 A | 8/1998 | Jiang | |
| 7,355,868 B2 * | 4/2008 | Soldano | 363/89 |
| 7,605,570 B2 * | 10/2009 | Liu et al. | 323/207 |
| 8,270,129 B2 * | 9/2012 | Gjerde et al. | 361/18 |
| 2010/0277837 A1 | 11/2010 | Myhre et al. | |
| 2011/0134671 A1 | 6/2011 | Balocco | |
| 2012/0236439 A1 * | 9/2012 | Nguyen | 361/18 |

FOREIGN PATENT DOCUMENTS

| | | |
|---|---|---|
| CN | 101931319 A | 12/2010 |
| CN | 201846235 U | 5/2011 |

OTHER PUBLICATIONS

International Search Report and Written Opinion received in International Application No. PCT/CN2011/079590, mailed May 24, 2012, 12 pages.

* cited by examiner

*Primary Examiner* — Dharti Patel
(74) *Attorney, Agent, or Firm* — Slater & Matsil, L.L.P.

(57) ABSTRACT

An embodiment bridgeless power factor correction circuit comprises a first boost converter and a second boost converter connected in parallel. A first switch is coupled between the input of the first boost converter and ground. A second switch is coupled between the input of the second boost converter and ground. Both the first switch and the second switch help to reduce the common mode noise of the bridgeless power factor correction circuit. The bridgeless power factor correction circuit further comprises two surge protection diodes coupled between the inputs of two boost converters and the output of the bridgeless power factor correction circuit.

20 Claims, 8 Drawing Sheets

US 8,385,032 B1

HIGH EFFICIENCY BRIDGELESS PFC CONVERTER AND METHOD

TECHNICAL FIELD

The present invention relates to devices and methods for bridgeless power factor correction converters, and more particularly, to devices and methods for bridgeless power factor correction converters with high efficiency.

BACKGROUND

A telecommunication network power system usually includes an ac-dc stage converting the power from the ac utility line to a 48V dc distribution bus. A conventional ac-dc stage may comprise a variety of EMI filters, a bridge rectifier formed by four diodes, a power factor correction circuit and an isolated dc/dc power converter. The bridge rectifier converts an ac voltage into a full-wave rectified dc voltage. Such a full-wave rectified dc voltage provides a dc input voltage for the power factor correction circuit. The power factor correction circuit may be implemented by employing a power converter including a boost converter. By employing an appropriate control circuit, the boost converter is capable of shaping the input line current to be sinusoidal and in phase with the sinusoidal input voltage of the ac input source. As a result, the power factor of the ac-dc stage may be close to unity as required by a variety of international standards (e.g., EU standard EN55022).

A boost converter may comprise an inductor coupled between the input voltage and a joint point of a switch and a diode. In the power management industry, the joint point of the switch and the diode is commonly referred to as the switching node of a power converter. In the boost converter, the switch is coupled between the switching node and ground. The diode is placed between the switching node and the output of the boost converter. As indicated by its name, a boost converter's output voltage is greater than its input voltage. When the switch is turned on, the inductor is charged from the input voltage through the turned on switch. At the same time, the diode is reverse-biased so that the output of the boost converter is isolated from the input of the boost converter. On the other hand, when the switch is turned off, the diode is forward-biased. As a result, the output of the boost converter receives energy from the charged inductor as well as the input voltage.

The full bridge rectifier of a conventional ac-dc power stage may comprise four diodes. In comparison with a switching element, such as a metal oxide semiconductor field effect transistor (MOSFET), the conduction loss of a diode is much higher due to the large forward voltage drop of the diode. The considerable power losses from the full bridge rectifier may further reduce the efficiency of the ac-dc power stage.

SUMMARY OF THE INVENTION

These and other problems are generally solved or circumvented, and technical advantages are generally achieved, by preferred embodiments of the present invention which provide an apparatus and method for achieving a high efficiency bridgeless power factor correction circuit.

In accordance with an embodiment, an apparatus comprises a first boost converter coupled between an input ac source and an output, a second boost converter coupled between the input ac source and the output, a first switch coupled between an input of the first boost converter and ground, a second switch coupled between an input of the second boost converter and ground. The apparatus further comprises a first surge protection diode coupled between the input of the first boost converter and the output and a second surge protection diode coupled between the input of the second boost converter and the output.

In accordance with another embodiment, a method comprises detecting a first half cycle of an input ac source, activating a first boost converter and a second switch coupled between an input of a second boost converter and ground. The method further comprises detecting a second half cycle of the input ac source and activating the second boost converter and a first switch coupled between an input of the first boost converter and ground.

In accordance with yet another embodiment, a method comprises configuring a first surge protection diode forward-biased wherein the first surge protection diode is coupled between a first terminal of an input ac source and an output of a bridgeless power factor correction circuit and forming a first surge energy discharge path comprising the first surge protection diode, a load resistor and a second switch coupled between a second terminal of the input ac source and ground. The method further comprises configuring a second surge protection diode forward-biased wherein the second surge protection diode is coupled between the second terminal of the input ac source and the output of the bridgeless power factor correction circuit and forming a second surge energy discharge path comprising the second surge protection diode, the load resistor and a first switch coupled between the first terminal of the input ac source and ground.

An advantage of an embodiment of the present invention is reducing the power loss as well as common mode noise of a bridgeless factor correction circuit so as to improve the efficiency, reliability and cost of a power system having the bridgeless factor correction circuit.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a high efficiency bridgeless power factor correction circuit. The invention may also be applied, however, to a variety of power factor correction circuits operating in different modes (e.g., discontinuous conduction mode, critical conduction mode or continuous conduction mode), employing different modulation mechanisms (e.g., leading edge pulse width modulation, trailing edge pulse width modulation or pulse frequency modulation) and adopting different control schemes (e.g., peak current mode control or average current mode control).

Figure 1:
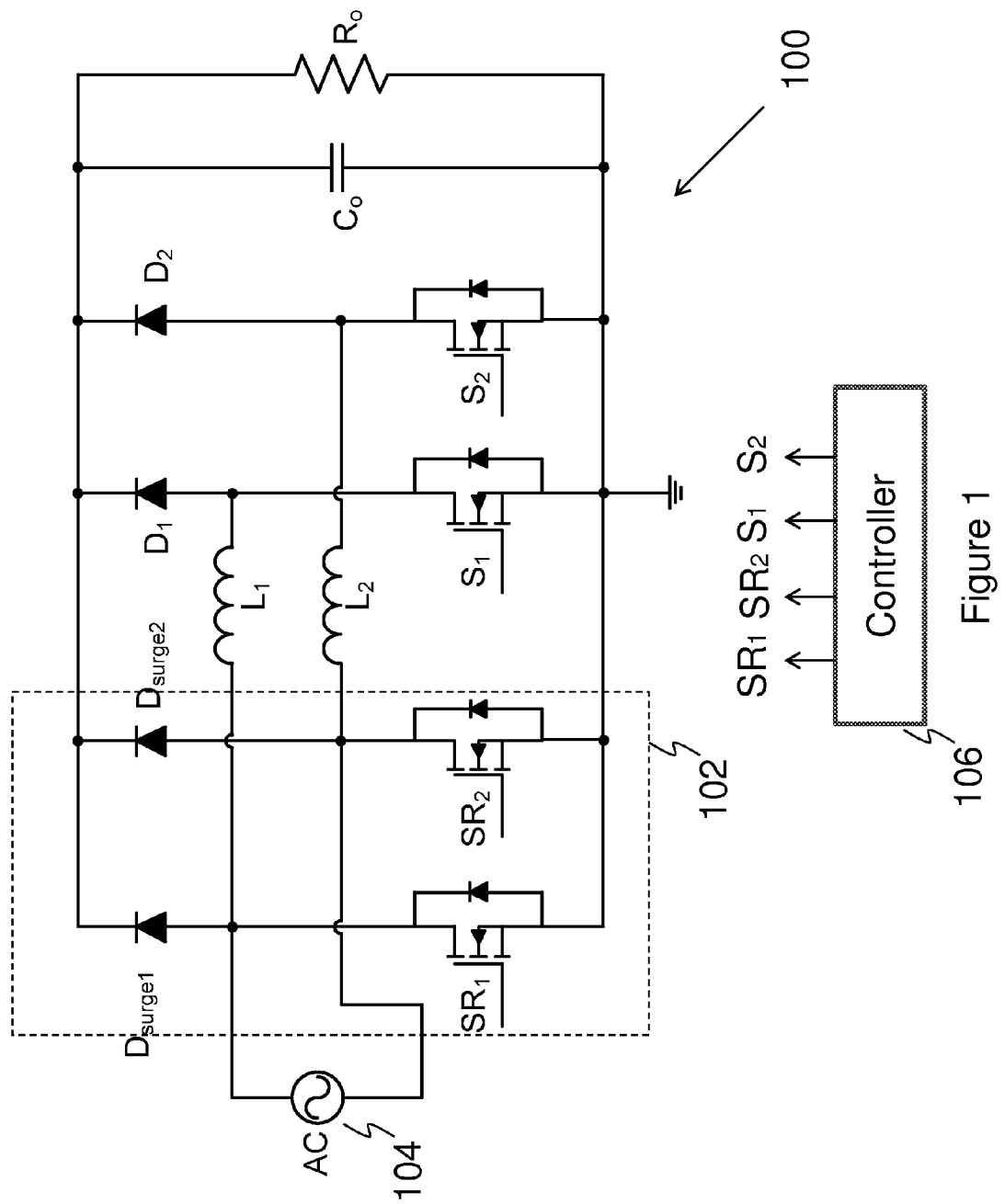
FIG. 1 illustrates a schematic diagram of a bridgeless power factor correction circuit in accordance with an embodiment.

Referring initially to FIG. 1, a schematic diagram of a bridgeless power factor correction circuit is illustrated in accordance with an embodiment. The bridgeless power factor correction circuit 100 has an input coupled to an ac power source, an output coupled to an output capacitor Co, which is connected in parallel to a load represented by a resistor Ro. As shown in FIG. 1, the bridgeless power factor correction circuit 100 comprises two boost converters configured to work in tandem. More particularly, a first inductor L1, a first switch S1 and a first diode D1 form the first boost converter providing power factor correction during the first half cycle of the input ac source. Similarly, a second inductor L2, a second switch S2 and a second diode D2 form the second boost converter, which is activated by a controller 106 to provide power factor correction during the second half cycle of the input ac source.

As shown in FIG. 1, both the first inductor L1 and the second inductor L2 have a terminal coupled to the inputs of the input ac source respectively. As a result, the output of the power factor correction circuit 100 may be floating regarding the input ac source if switches SR1 and SR2 are not included in the power factor correction circuit 100. Such a floating output regarding the input ac source makes the power factor correction circuit 100 susceptible to common mode noise. In order to prevent the output of the power factor correction circuit 100 from floating, the switches SR1 and SR2 are added so that the output of the bridgeless power factor correction 100 is coupled to the input line through the switches SR1 or SR2 all the time. The detailed operation of the switches SR1 and SR2 will be described below in respect to FIGS. 2-5. Furthermore, two surge protection diodes Dsurge1 and Dsurge2 are employed to protect the bridgeless power factor correction circuit 100 from either surges occurred in the first half cycle of the input ac source or surges occurred in the second half cycle of the input ac source.

Figure 2:
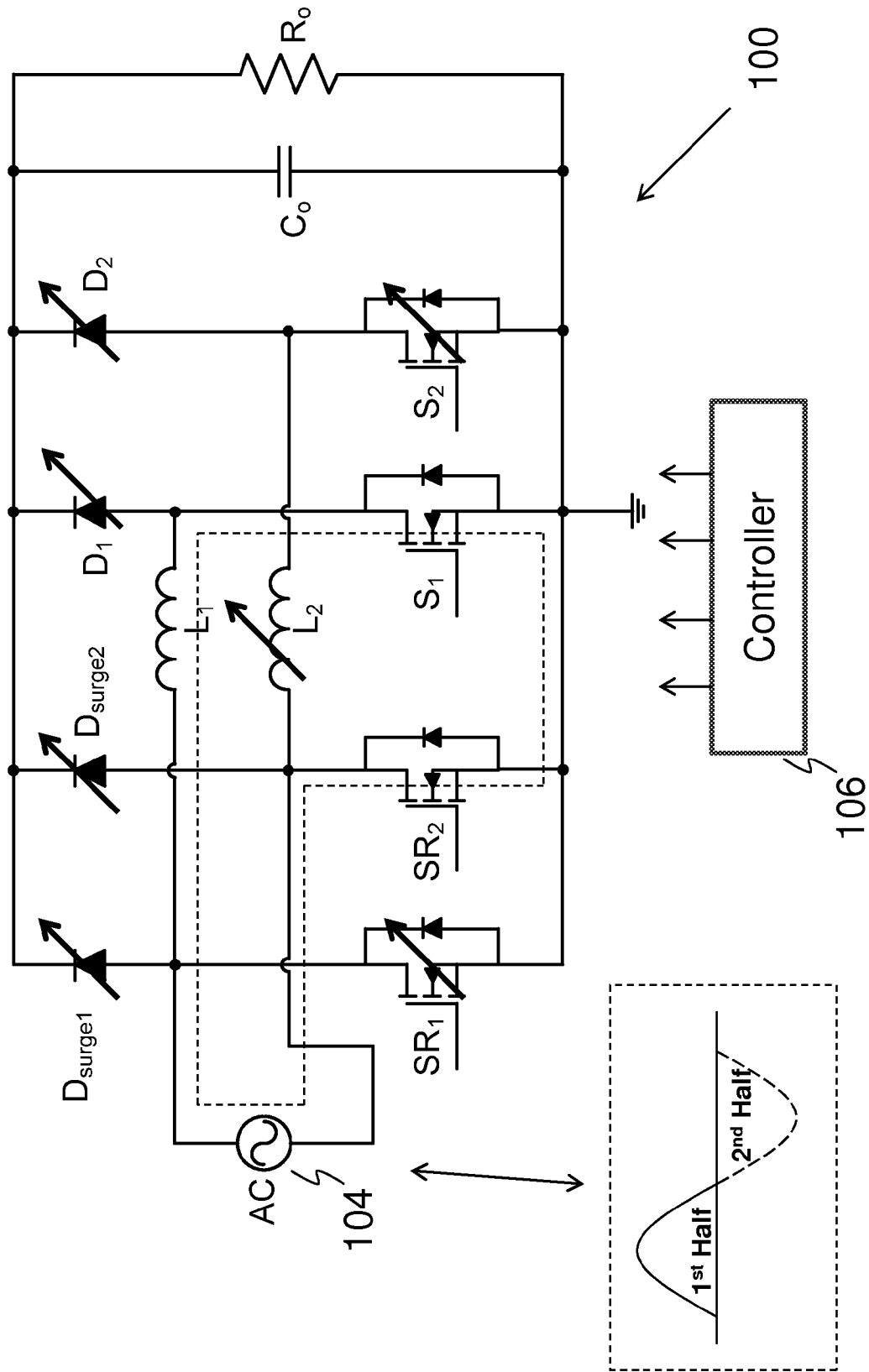
FIG. 2 illustrates a schematic diagram of a bridgeless power factor correction circuit operating in a switch conduction mode in the first half cycle of the input ac source in accordance with an embodiment.

FIG. 2 illustrates a schematic diagram of a bridgeless power factor correction circuit operating in a switch conduction mode in the first half cycle of the input ac source in accordance with an embodiment. When the first half cycle of the input ac source is applied to the bridgeless power factor correction circuit 100, in response to the first half cycle, the controller 106 turns off the second switch S2 and the switch SR1. Simultaneously, the switch SR2 is turned on. The on/off status of the first switch S1 and the first diode D1 is determined by the operation principles of boost converters.

During the on period of the first switch S1, the first diode D1 is reverse-biased. As a result, the input ac source charges the first inductor L1 through a conductive path formed by the first inductor L1, the first switch S1 and the switch SR2. In FIG. 2, the dashed line indicates the conductive path during the switch-on period of the first half cycle of the input ac source. It should be noted that the black arrows placed on top of the components of FIG. 2 indicate such components are disabled during this phase of the operation of the bridgeless power factor correction circuit 100. It should further be noted that while FIG. 2 shows the charge current flows through the switch SR2, alternatively, a person skilled in the art will recognize that the charge current may flow through the body diode of the switch SR2. An advantageous feature of having a turned on switch SR2 is that the turned on switch SR2 may provide a smaller voltage drop in comparison with the large drop of a body diode. As a result, the turned on switch SR2 helps to improve the efficiency of the bridgeless power factor correction circuit 100.

Another advantageous feature of having the turned on switch SR2 is the common mode noise of the bridgeless power factor correction circuit 100 is reduced by connected the output's ground to the input ac source directly. In a conventional bridgeless power factor correction circuit, the charge current flows through a conductive path formed by the body diode of the second switch S2 and the second inductor L2. The ground connection of the conventional technique is not connected to the input ac source directly. In contrast, as shown in FIG. 2, during the on period of the first switch S1, the output of the bridgeless power factor correction circuit 100 has a ground connection coupled to the input ac source through the turned on switch SR2. Therefore, the output of the bridgeless power factor correction circuit 100 is not floating. An advantageous feature of employing the switch SR2 is that the common mode noise issue in a conventional bridgeless power factor correction circuit is avoided because the second inductor L2 no longer prevents the output of the bridgeless power factor correction circuit 100 from being connected to the input ac source directly.

Figure 3:
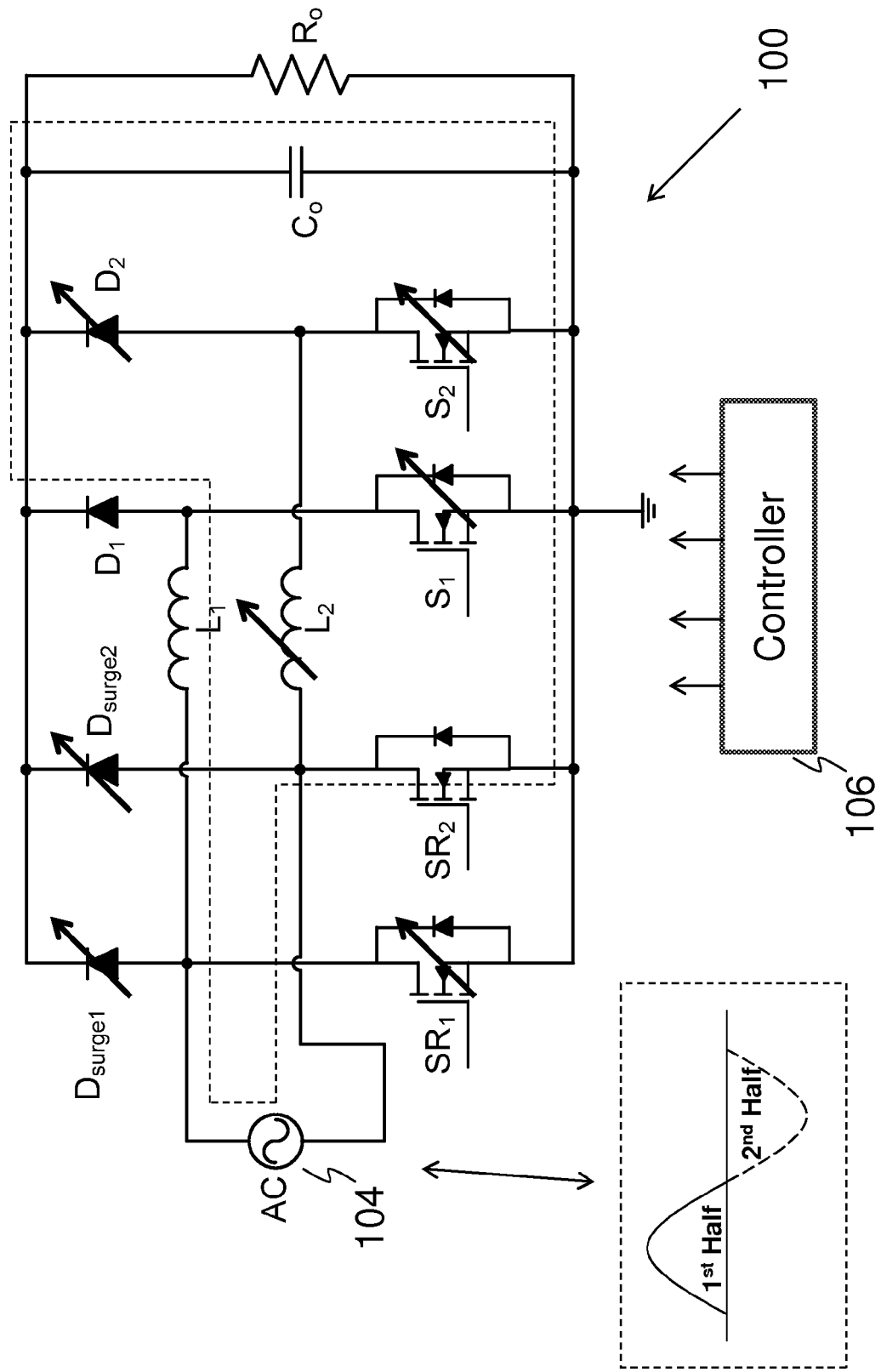
FIG. 3 illustrates a schematic diagram of a bridgeless power factor correction circuit operating in a diode conduction mode in the first half cycle of the input ac source in accordance with an embodiment.

FIG. 3 illustrates a schematic diagram of a bridgeless power factor correction circuit operating in a diode conduction mode in the first half cycle of the input ac source in accordance with an embodiment. Similar to that of FIG. 2, when the first half cycle of the input ac source is applied to the bridgeless power factor correction circuit 100, in response to the first half cycle, the controller 106 turns off the second switch S2 and the switch SR1, and turns on the switch SR2. The on/off status of the first switch S1 and the first diode D1 is determined by the operation principles of a boost converter. When the first switch S1 is turned off, the first diode D1 is forward-biased. As a result, the input ac source as well as the charged inductor delivers energy through a conductive path formed by the first inductor L1, the first diode D1 and the switch SR2. In FIG. 3, the dashed line indicates the conductive path during the diode conduction mode of the bridgeless power factor correction circuit 100 in the first half cycle of the input ac source.

As shown in FIG. 3, during the forward conduction of the first diode D1, the output of the bridgeless power factor correction circuit 100 has a connection coupled to the input ac source through the turned on switch SR2. Therefore, the output of the bridgeless power factor correction circuit 100 is not floating. Similarly, an advantageous feature of employing the switch SR2 is that during the first conduction period, the common mode noise issue in a conventional bridgeless power factor correction circuit is avoided because the second inductor L2 no longer prevents the output of the bridgeless power factor correction circuit 100 from being connected to the input ac source.

Figure 4:
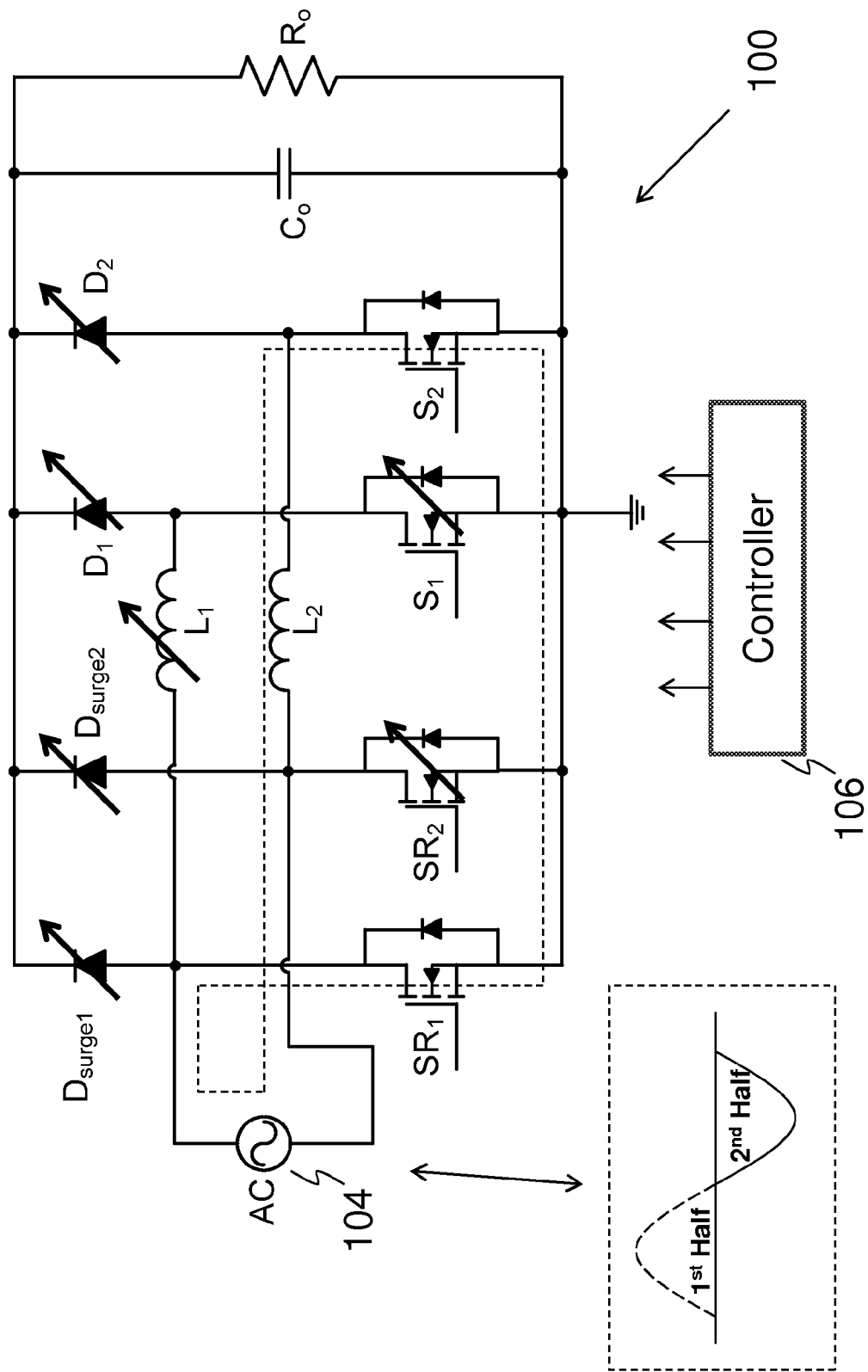
FIG. 4 illustrates a schematic diagram of a bridgeless power factor correction circuit operating in a switch conduction mode in the second half cycle of the input ac source in accordance with an embodiment.

FIG. 4 illustrates a schematic diagram of a bridgeless power factor correction circuit operating in a switch conduction mode in the second half cycle of the input ac source in accordance with an embodiment. When the second half cycle of the input ac source is applied to the bridgeless power factor correction circuit 100, in response to the polarity change of the input ac source, the controller 106 turns off the second switch S1 and the switch SR2, and turns on the switch SR1. The second inductor L2, the second switch S2 and the second diode D2 form a boost converter. The on/off status of the second switch S2 and the second diode D2 is determined by the operation principles of boost converters. FIG. 4 shows the second switch conduction period in which the second diode D2 is reverse-biased. During the second switch conduction period, the input ac source charges the second inductor L2 through a conductive path formed by the second inductor L2, the second switch S2 and the switch SR1. In FIG. 4, the dashed line indicates the conductive path during the switch on period of the second half cycle of the input ac source.

As shown in FIG. 4, during the on period of the second switch S2, the output of the bridgeless power factor correction circuit 100 has a connection coupled to the input ac source through the turned on switch SR1. The output of the bridgeless power factor correction circuit 100 is not floating because the turned on switch SR1 bypasses a conventional conductive path formed by the body diode of the first switch S1 and the first inductor L1. Similar to the first half cycle of the input ac source, an advantageous feature of employing the switch SR1 in the second half cycle is that the common mode noise issue in a conventional bridgeless power factor correction circuit is avoided because the first inductor L1 no longer prevents the output of the bridgeless power factor correction circuit 100 from being connected to the input ac source directly.

Figure 5:
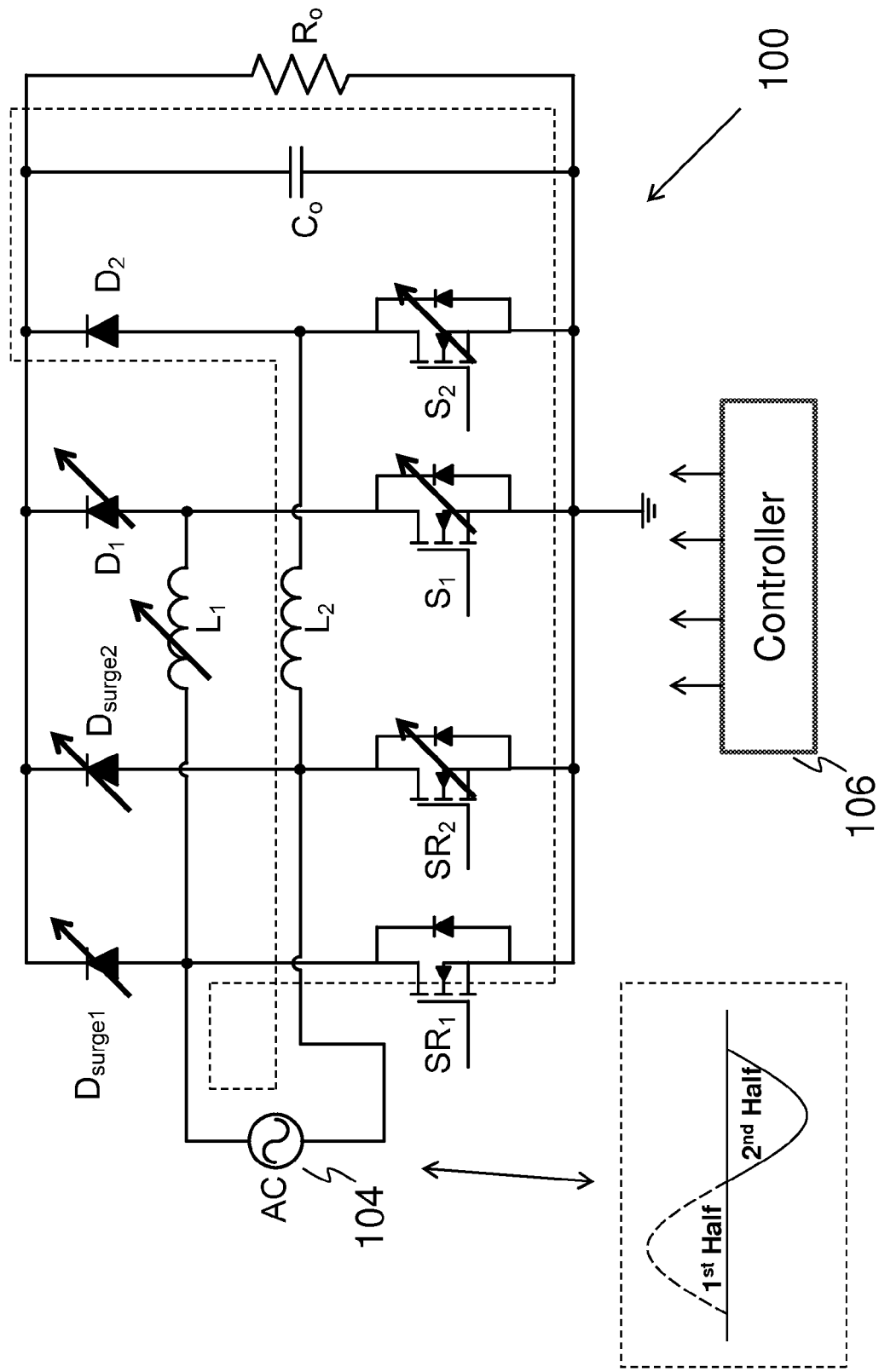
FIG. 5 illustrates a schematic diagram of a bridgeless power factor correction circuit operating in a diode conduction mode in the second half cycle of the input ac source in accordance with an embodiment.

FIG. 5 illustrates a schematic diagram of a bridgeless power factor correction circuit operating in a diode conduction mode in the second half cycle of the input line in accordance with an embodiment. Similar to that of FIG. 4, when the second half cycle of the input ac source is applied to the bridgeless power factor correction circuit 100, in response to the second half cycle, the controller 106 turns off the first switch S1 and the switch SR2. According to the operation principles of boost converters, at the beginning of a period of a boost converter, the second switch S2 are first turned on.

The controller 106 determines the duty cycle of the second switch S2 based upon the feedback information such as the output voltage and sensed current flowing through the second inductor L2. After the second switch S2 is turned off in accordance with the instructions from the controller 106, the second diode D2 is forward-biased. As a result, the input ac source as well as the charged inductor delivers energy through a conductive path formed by the second inductor L2, the second diode D2 and the switch SR1. In FIG. 5, the dashed line indicates the conductive path during the diode conduction period of the second half cycle of the input ac source.

As shown in FIG. 5, during the forward conduction of the second diode D2, the output of the bridgeless power factor correction circuit 100 has a connection coupled to the input ac source through the turned on switch SR1. Therefore, the output of the bridgeless power factor correction circuit 100 is not floating. Similarly, an advantageous feature of employing the switch SR1 is that during the second diode conduction period, the common mode noise issue in a conventional bridgeless power factor correction circuit is avoided because the first inductor L1 no longer prevents the output of the bridgeless power factor correction circuit 100 from being connected to the input ac source directly.

Figure 6:
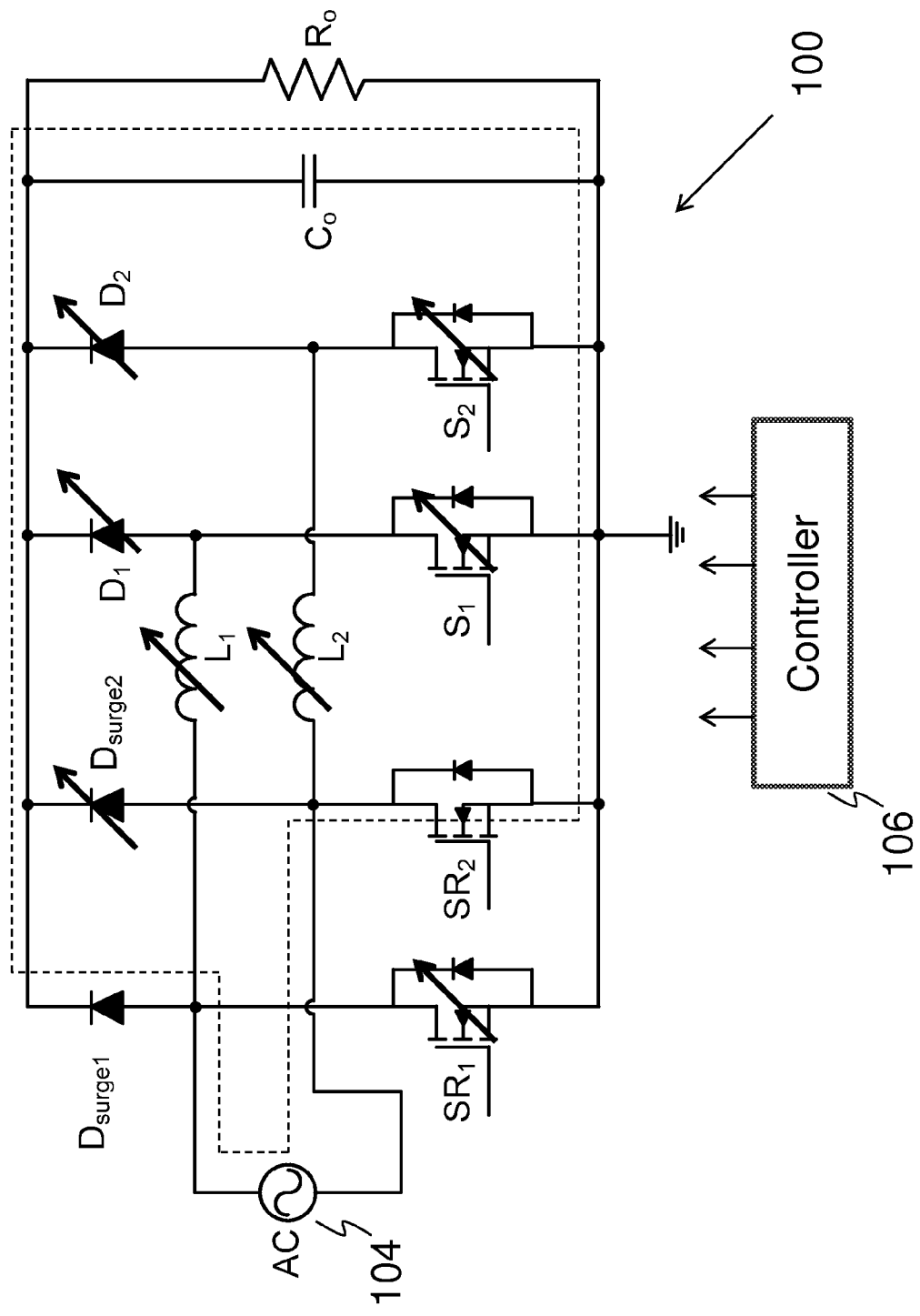
FIG. 6 illustrates a schematic diagram of a bridgeless power factor correction circuit operating in a first half cycle power surge mode in accordance with an embodiment.

FIG. 6 illustrates a schematic diagram of a bridgeless power factor correction circuit operating in a first half cycle power surge mode in accordance with an embodiment. When a surge occurs during the first half cycle of the input ac source, the input voltage amplitude may increase as a result. When the voltage amplitude reaches a level approximately equal to the output voltage, the first surge protection diode Dsurge1 will be turned on, and the voltage applied to the bridgeless power factor correction circuit 100 will be clamped to the output voltage. As such, the surge protection diode Dsurge1 helps to prevent the surge from damaging the bridgeless power factor correction circuit 100. During this process, the bridgeless power factor correction circuit 100 may detect a power surge occurred in the first half cycle of the input ac source, and protect the bridgeless power factor correction circuit 100 by shutting down the first switch S1 and other appropriate components.

Furthermore, the energy from the voltage surge is discharged through a conductive path formed by the first surge protection diode Dsurge1, output capacitor Co, the load resistor Ro and the switch SR2. As a result, the conduction of the first surge protection diode Dsurge1 limits the voltage applied to the bridgeless power factor correction circuit 100 to a voltage level approximately equal to the output voltage plus a diode voltage drop. In accordance with an embodiment, by employing the first surge protection diode Dsurge1, the highest voltage the bridgeless power factor correction circuit 100 endures is around 400V.

Figure 7:
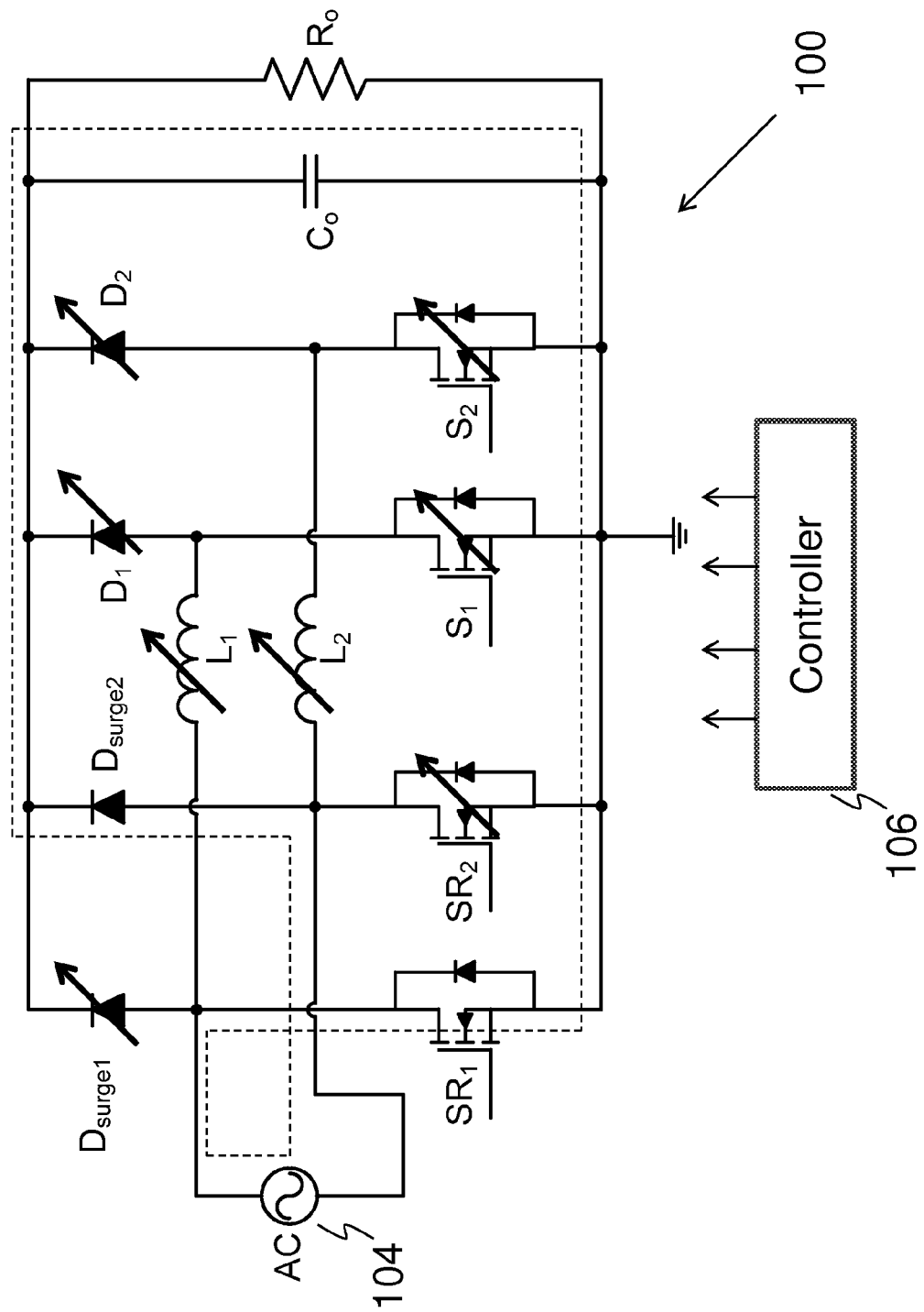
FIG. 7 illustrates a schematic diagram of a bridgeless power factor correction circuit operating in a second half cycle power surge mode in accordance with an embodiment.

Similarly, the second surge protection diode Durge2 can prevent the surge from damaging the bridgeless power factor correction circuit 100 in a second half cycle of the power surge. FIG. 7 illustrates a schematic diagram of a bridgeless power factor correction circuit operating in a second half cycle power surge mode in accordance with an embodiment. When a surge occurs during the second half cycle of the input ac source, the input voltage amplitude may increase as a result. When the input voltage amplitude reaches a level slightly higher than the output voltage, the second surge protection diode Dsurge2 will be turned on, and the surge voltage applied to the bridgeless power factor correction circuit 100 will be clamped to the output voltage. As such, the second surge protection diode Dsurge2 helps to prevent the surge from damaging the bridgeless power factor correction circuit 100. During this process, the bridgeless power factor correction circuit 100 may detect a power surge occurred in the second half cycle of the input ac source, and protect the bridgeless power factor correction circuit 100 by shutting down the second switch S2 and other appropriate components.

Furthermore, in the second cycle of the input ac source, the energy from the voltage surge is discharged through a conductive path formed by the second surge protection diode Dsurge2, the output capacitor Co, the load resistor Ro and the switch SR1. As a result, the conduction of the second surge protection diode Dsurge2 limits the voltage applied to the bridgeless power factor correction circuit 100 to a voltage level approximately equal to the output voltage plus a diode voltage drop. In accordance with an embodiment, by employing the second surge protection diode Dsurge2, the highest voltage the bridgeless power factor correction circuit 100 endures is around 400V. In sum, both surge protection diodes Dsurge1 and Dsurge2 provide an automatic protection mechanism for input voltage surges. Furthermore, the surge protection diodes (e.g., Dsurge1) and the switch (e.g., SR2) provide a surge energy discharge path so that the components of the bridgeless power factor correction circuit are protected accordingly.

Figure 8:
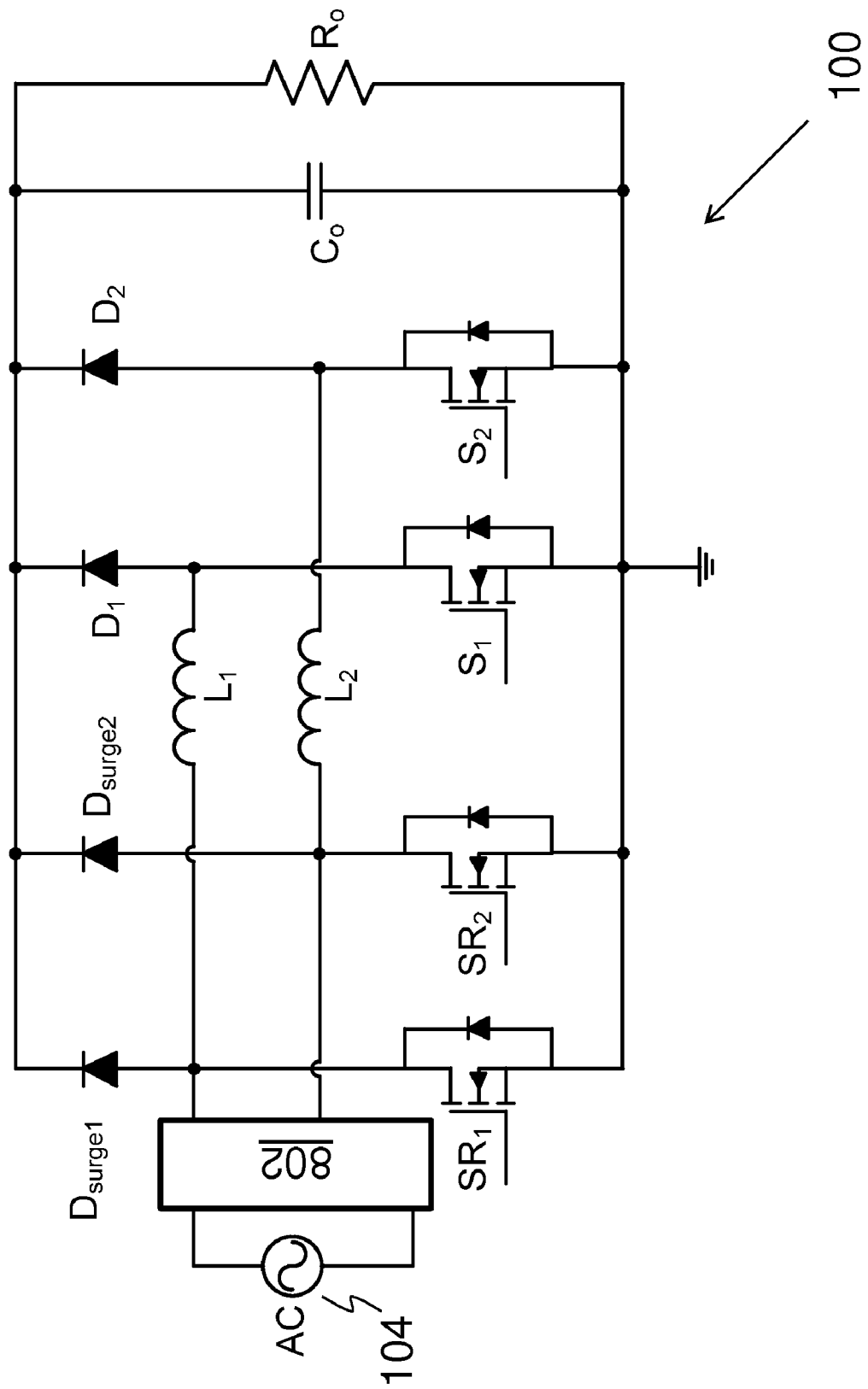
FIG. 8 illustrates a schematic diagram of a bridgeless power factor correction circuit having an input filter in accordance with an embodiment.

FIG. 8 illustrates a schematic diagram of a bridgeless power factor correction circuit having an input filter in accordance with an embodiment. An input filter 802 may be employed to provide high frequency filtering for the bridgeless power factor correction circuit 100. As shown in FIG. 8, the input filter 802 is coupled between the input ac source and the bridgeless power factor correction circuit 100. The operation of the input filter 802 is well known in the art, and hence is not discussed in further detail to avoid unnecessary repetition.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
    a first boost converter coupled between an input ac source and an output;
    a second boost converter coupled between the input ac source and the output;
    a first switch coupled between an input of the first boost converter and ground;
    a second switch coupled between an input of the second boost converter and ground;
    a first surge protection diode coupled between the input of the first boost converter and the output; and
    a second surge protection diode coupled between the input of the second boost converter and the output.

2. The apparatus of claim 1, wherein the first boost converter comprises:
    a first inductor having a first terminal coupled to the first surge protection diode and the first switch;
    a first switching element coupled between a second terminal of the first inductor and ground; and
    a first diode coupled between the second terminal of the first inductor and the output.

3. The apparatus of claim 1, wherein the second boost converter comprises:
    a second inductor having a first terminal coupled to the second surge protection diode and the second switch;
    a second switching element coupled between a second terminal of the second inductor and ground; and
    a second diode coupled between the second terminal of the second inductor and the output.

4. The apparatus of claim 1, wherein the output comprises:
    a capacitor coupled between the output and ground; and
    a resistor connected in parallel with the capacitor.

5. The apparatus of claim 1, wherein the first switch is an n-type switching element.

6. The apparatus of claim 1, wherein the second switch is an n-type switching element.

7. The apparatus of claim 1, further comprising a controller having four output signals configured to control the first boost converter, the second boost converter, the first switch and the second switch respectively.

8. A method comprising:
    detecting a first half cycle of an input ac source;
    activating a first boost converter coupled to the input ac source and a second switch coupled between an input of a second boost converter and ground;
    detecting a second half cycle of the input ac source; and
    activating the second boost converter coupled to the input ac source and a first switch coupled between an input of the first boost converter and ground.

9. The method of claim 8, further comprising:
    charging a first inductor of the first boost converter through a first switching element of the first boost converter and the second switch; and
    charging an output of a bridgeless power factor correction circuit through the first inductor, a first diode of the first boost converter and the second switch.

10. The method of claim 8, further comprising:
    charging a second inductor of the second boost converter through a second switching element of the second boost converter and the first switch; and
    charging an output of a bridgeless power factor correction circuit through the second inductor, a second diode of the second boost converter and the first switch.

11. The method of claim 8, further comprising:
    in the first half cycle of the input ac source, forming a first conductive path for a first switch conduction mode comprising:
        the input ac source;
        a first inductor;
        a first switching element; and
        the second switch.

12. The method of claim 8, further comprising:
    in the first half cycle of the input ac source, forming a second conductive path for a first diode conduction mode comprising:
        the input ac source;
        a first inductor;
        a first diode;
        a resistor; and
        the second switch.

13. The method of claim 8, further comprising:
in the second half cycle of the input ac source, forming a third conductive path for a second switch conduction mode comprising:
   the input ac source;
   a second inductor;
   a second switching element; and
   the first switch.

14. The method of claim 8, further comprising:
in the second half cycle of the input ac source, forming a fourth conductive path for a second diode conduction mode comprising:
   the input ac source;
   a second inductor;
   a second diode;
   a resistor; and
   the first switch.

15. The method of claim 8, further comprising:
detecting the first half cycle of the input ac source by a controller; and
detecting the second half cycle of the input ac source by the controller.

16. A method comprising:
configuring a first surge protection diode forward-biased, wherein the first surge protection diode is coupled between a first terminal of an input ac source and an output of a bridgeless power factor correction circuit;
forming a first surge energy discharge path comprising:
   the first surge protection diode;
   a load resistor; and
   a second switch coupled between a second terminal of the input ac source and ground;
configuring a second surge protection diode forward-biased, wherein the second surge protection diode is coupled between the second terminal of the input ac source and the output of the bridgeless power factor correction circuit; and
forming a second surge energy discharge path comprising:
   the second surge protection diode;
   the load resistor; and
   a first switch coupled between the first terminal of the input ac source and ground.

17. The method of claim 16, further comprising:
detecting a first voltage surge during a first half cycle of the input ac source;
disabling a first boost converter;
disabling a second boost converter connected in parallel with the first boost converter; and
enabling the second switch.

18. The method of claim 16, further comprising:
detecting a second voltage surge during a second half cycle of the input ac source;
disabling a first boost converter;
disabling a second boost converter connected in parallel with the first boost converter; and
enabling the first switch.

19. The method of claim 16, further comprising:
detecting a first half cycle of the input ac source using a controller; and
activating the second switch.

20. The method of claim 16, further comprising:
detecting a second half cycle of the input ac source using a controller; and
activating the first switch.

\* \* \* \* \*